Dec. 15, 1953
A. A. GRADISAR
2,662,444
ADJUSTMENT MECHANISM FOR MICROSCOPES
Original Filed June 29, 1946
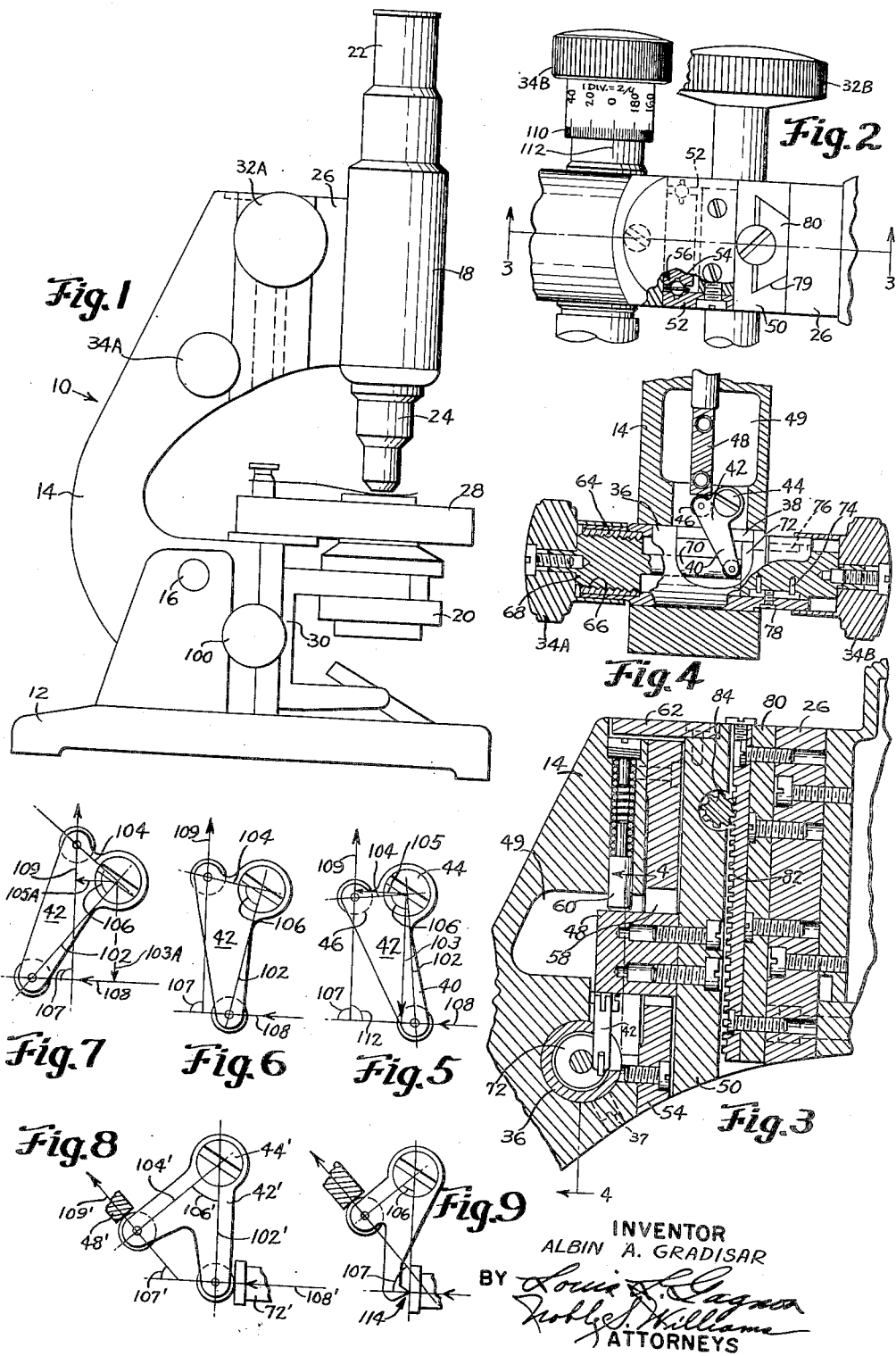
INVENTOR
ALBIN A. GRADISAR
BY
ATTORNEYS Patented Dec. 15, 1953

2,662,444

UNITED STATES PATENT OFFICE 2,662,444

ADJUSTMENT MECHANISM FOR MICROSCOPES

Albin A. Gradisar, Snyder, N. Y., assignor to American Optical Company, Southbridge, Mass., a voluntary association of Massachusetts Original application June 29, 1946, Serial No. 680,446, now Patent No. 2,560,169, dated July 10, 1951. Divided and this application March 14, 1950, Serial No. 149,568

3 Claims. (Cl. 88—39)

This invention relates to adjustment mechanisms for microscopes and the like, and more particularly relates to fine adjustment mechanisms for accurately focusing the body tubes of such microscopes relative to the stages thereof. The invention is equally useful for adjusting the condenser assemblies of such microscopes, when desired, relative to their stages. This application is a division of my copending application Serial No. 680,446, filed June 29, 1946, now Patent No. 2,560,169.

The high degree of refinement to which the present day research, polarizing, petrographic and similar microscopes have been developed has resulted in placing exceedingly heavy loads upon both the coarse and fine adjustment mechanisms for the body tubes of such microscopes. Similarly heavy loads have been placed upon the adjustment mechanisms for the condenser assemblies of such microscopes. For example, when a microscope body tube is provided with an inclined binocular head and a rotatable nosepiece carrying three or four objectives, the weight upon the adjustment mechanisms therefor at the upper end of the tiltable supporting arm of the microscope becomes excessive. Likewise a condenser assembly which uses, for example, a main condenser unit, a swingable auxiliary condenser unit, an Ahrens polarizer, a pair of adjustable iris diaphragms and a mirror places a heavy load upon the adjustment mechanism employed for mounting such structure upon the lower end of the tiltable supporting arm of the microscope. It is not only necessary that such adjustment mechanisms move the body tube and condenser assembly smoothly and evenly throughout their entire range of travel but equally necessary that they be definite and positive in their holding action for maintaining the parts in any adjusted position during use of the instrument. Furthermore, during use of such a highly developed instrument, it is often desirable to be able to adjust the body tube accurately through minute known distances for measuring thicknesses of specimens and the like, without requiring calculations to be made and without consideration of the particular position of the body tube on the supporting arm, as was formerly required when accurate depth measurements were desired.

It is, accordingly, an object of the present invention to provide new and improved fine adjustment mechanisms for microscopes. It is a further object of the invention to provide new and improved mechanisms for producing fine adjustment between relatively movable parts of a microscope with the operating parts of said mechanism completely enclosed so as to be concealed and protected from dust and the like. It is an additional object of the invention to provide fine adjustment mechanisms of the character described which are of economical and sturdy construction, are formed of few parts, are constructed and calibrated to give positive operation and accurate indication of distances traversed by body tube or condenser assembly and which have a minimum number of movable parts where any appreciable wear may occur.

Other objects and advantages will become apparent from the following description of a preferred form of the invention when taken in conjunction with the accompanying drawing, in which:

Fig. 1 is a side elevational view of a microscope embodying the present invention;

Fig. 2 is an enlarged plan view of certain adjustable parts of the microscope of Fig. 1 and showing portions thereof in section;

Fig. 3 is a sectional view taken substantially on line 3—3 of Fig. 2 and looking in the direction of the arrows;

Fig. 4 is a sectional view taken substantially on line 4—4 of Fig. 3 and looking in the direction of the arrows;

Fig. 5 is a side view of the lever mechanism of Fig. 4, enlarged somewhat to show certain details thereof;

Figs. 6 and 7 show different positions for the lever mechanism of Fig. 5;

Fig. 8 is similar to Fig. 5 but shows the invention applied to a lever mechanism of different shape to accommodate driving and driven members which act in directions which differ materially from the ninety degree relationship provided in Fig. 5; and Fig. 9 is a fragmentary view of a modified lever arm construction.

Referring to the drawing in detail, it will be seen that the microscope indicated generally by the numeral 10 has a supporting base 12 upon which a curved supporting arm 14 is tiltably mounted for pivotal movement about an inclination joint 16 so that a microscope body tube 18 carried upon the upper end of this arm and a condenser assembly 20 carried upon the lower end thereof may be simultaneously tilted for conveniently positioning an eyepiece 22 for use by an operator. On the lower end of body tube 18 is carried an objective 24. While the present disclosure of Fig. 1 shows a monocular microscope secured to a supporting or mounting block 26 on arm 14 and employs only a single objective, it will be obvious to those skilled in the art that other types of body tubes carrying heavier structures of known construction may as readily be secured upon the mounting block 26 for adjustment purposes. Adjustment of block 26 and the structure carried thereby will move and focus the objective 24 relative to a stage 28 and objects or specimens supported thereon. Adjustment of a carriage 30 supported on the lower end of arm 14 will change the position of the condenser assembly 20 relative to the stage 28.

In order to provide coarse and fine adjustments for the body tube 18 there are provided a pair of knobs 32A and 32B and a second pair of knobs 34A and 34B, respectively. The knobs 34A and 34B are located appreciably lower on the supporting arm 14 than the knobs 32A and 32B for the convenience of the operator during fine adjustment and inspection of specimens. Referring to Figs. 3 and 4, it will be seen that the fine adjustment mechanism comprises a tubular member 36 secured in a transverse opening in the arm 14 by screws 37 and this member 36 has an opening 38 formed therein for receiving the lower long arm 40 of a lever 42 which is pivoted on member 44 threaded into the supporting arm 14. Pivot member 44 is so positioned that a short arm 46 of said lever engages the rectilinear lower surface of said block which is disposed at right angles to the direction of movement of the block 48 so that as the lower end 40 of the lever is moved laterally the short arm thereof will vertically adjust the block 48. An irregular recess 49 is provided in arm 14 for accommodating portions of block 48 and lever 42. Small antifriction rollers are carried by the long and short arms of lever 42 for reducing friction in the parts and so that the slight arcuate movement of said short arm 46 about pivot 44 will not produce any lateral pressure on block 48.

Block 48 is rigidly secured to an intermediate supporting member 50 which has secured at its opposite sides bearing blocks 52. A bearing block 54 is suitably fixedly secured to the arm 14 and V-shaped vertically extending bearing guides are formed in the opposed surfaces of these blocks 52 and 54 so that a plurality of ball bearings separated by spacer members may be positioned, as indicated at 56, between these opposed guideways and serve to allow limited vertical movement of intermediate member 50 relative to the arm 14 and bearing block 54. The bearing block 54 is provided with a central opening 58 through which block 48 extends and this opening is of sufficient length to adequately allow the desired vertical movement of members 48 and 50 throughout the fine adjustment range of the instrument. A spring pressed plunger assembly 60 is arranged in arm 14 to bear downwardly upon the upper surface of block 48 and firmly maintain this block in engagement with the roller carried by the short arm of lever 42. A removable cover 62 is secured in a recess formed in the upper end of intermediate supporting member 50 and arranged to overlie the bearing guideways and said plunger assembly and protect same from dust, foreign particles and the like.

The tubular member 36 has end portions which extend appreciably laterally beyond the sides of arm 14 and one of these extensions is internally annularly recessed to receive a ring 64 of only slightly less internal diameter than tubular member 36 and the inner surface thereof is provided with fine threads adapted to be engaged by an enlarged threaded end portion 66 of a fine adjustment member 68. A narrower intermediate portion 70 of the member 68 is provided to accommodate the long arm of lever 42 and an integral bearing collar 72 is provided on member 68 adjacent narrow portion 70 for engagement with the roller on the end of long arm 40 so that as member 68 is rotated the threaded end portion 66 will cause lateral micrometer adjustment or displacement of the member 68 and bearing collar 72 and, accordingly, pivotal movement of lever 42 for the fine adjustment of the members 48 and 50 and thus microscope body tube 18. The collar 72 thus provides at all times a straight line or rectilinear bearing surface for engaging the roller on the long lever arm which is disposed at right angles to the direction of movement of the member 68.

Handles 34A and 34B are secured upon the opposite ends of member 68 for rotating this member and small pins 74 are positioned in laterally spaced relation in a recess 76 in the opposite end portion of member 68 for limiting the lateral adjustment thereof. A screw 78 is threaded into the tubular member 36 and its engagement with one or the other of these pins 74 serves as a positive stop to limit the lateral movement of the member 68 as it is rotated in either direction. Skirt portions on handle 34A and 34B overlie the extensions of the tubular member 36 and serve to exclude dust and the like from the interior of the fine adjustment mechanism. Thus it will be seen that adjustment of member 68 toward the left as viewed in Fig. 8 will cause a positive upward movement of block 48 and thus body tube 18. Conversely, spring plunger assembly 60 will cause downward movement of block 48 when the member 68 is shifted toward the right. However, since no positive connection is provided between block 48 and lever 42 no positive pull will be placed upon block 48, and should the microscope objective come into contact with the specimen or slide on the stage 28 no excessive or injurious stress will be transmitted to the delicate parts of the fine adjustment mechanism.

The intermediate supporting member 50 is provided with V-shaped guideways as indicated at 79 arranged to engage the wedge shaped member 80 secured to mounting block 26 and to the vertical central portion of member 80 is secured a rack bar 82 for engagement by a pinion 84 fixedly secured to an intermediate portion of a shaft (not shown), mounted for rotation in suitable bearings in the intermediate member 50. Either handle 32A or 32B may be used to rotate this shaft and pinion 84 in either direction for causing vertical movement of the rack 82, block 26 and body tube 18 for coarse adjustment thereof. While the rotatable parts of the coarse adjustment mechanism are shown as carried by the intermediate member 50 and the rack bar 82 is carried by block 26, it will be readily apparent that these parts could be reversed, if desired, so that bar 82 would be supported by the intermediate member 50 and the rotatable parts supported by the block 26. This would be a less desirable arrangement, however, since the control knobs 32A and 32B would then move up and down during coarse adjustment of the instrument. The condenser assembly 30, previously referred to, may be provided with an adjustment means 100 and it will be obvious that this adjustment means may be constructed in a manner similar to the structure just disclosed.

If reference is made to Fig. 5, it will be seen that lever 42 is so constructed and arranged that a straight line 102 extending through the center of the roller on long arm 40 and the center of the pivotal support member 44 and a second straight line 104 extending through the center of the roller on short arm 46 and the center of the pivotal support member 44 form an angle 106 therebetween which is equal in size to the angle of deviation 107 formed between the direction of the force 108 applied to lever arm 40 and acting through a single point (to provide an effective long lever arm distance 103) and the direction of the resultant force 109 produced by short arm 46 and acting through a single point (to provide an effective short lever arm distance 105). Such an arrangement provides a definite and constant lever arm ratio for the lever 42 notwithstanding the fact that the magnitudes of the distances 103 and 105 vary as the lever is angularly displaced, so that for each degree of rotation of the handles 34A and 34B, and thus for the bearing collar 72, throughout the entire range of operation and adjustment of collar 72, the block 48 will travel equal lineal amounts or units which are proportional to the effective lever arm ratio. It will be noted that angle 106 and the opposite included angle 112 are complementary, always equalling 180 degrees.

While Fig. 5 shows the lever 42 near one end of its range of fine adjustment and Figs. 6 and 7 show it pivoted about the member 44 to positions near the center and near the opposite end of this range, respectively, and the effective lever arms 103 and 105 have been foreshortened at 103A and 105A in Fig. 7, it should be noted that the angular values at 106 and 107 are still unchanged and that this foreshortening has been proportional, and thus a constant lever ratio is maintained. Thus when fine adjustment knob 34A or 34B is provided with a plurality of calibrations of equal size, such as indicated at 110 adjacent a zero reference mark 112 on a fixed part of the instrument, and spaced to provide a definite value therebetween (such as two microns per division) the lineal movement of the body tube 10 in either direction will be, for each division of rotation, equal to two microns regardless of the angular position of the lever 42 or the lateral displacement of adjustment member 68. Obviously the calibration 110 could be placed upon the fixed part and the zero reference placed on the knob if desired. It is, of course, essential that the surface engaged by the rollers on the long and short arms of the lever 42 be rectilinear and disposed at right angles to the direction of force being applied to the one roller and the direction of the resultant force being produced by the other roller.

In the present disclosure the angles 106 and 107 are each shown as right angles. It should be noted, however, that angles other than right angles may at times be required to produce constant lever arm ratio mechanisms so long as this angle included between the lever arm distances is made equal to the angle included between the applied and resultant forces. In Fig. 8, for example, is shown a driving member 72' arranged to move and exert a force in a direction 108' for moving lever 42' about pivotal support member 44' and so as to exert a force in a direction 109' and move a driven element 48' in the same direction. Lines 102' and 104' pass through the centers of the rollers and member 44'. Once again it will be noted that the included angle 106' is made equal to the angle of deviation 107' so that a constant ratio condition may be maintained by the mechanism.

While the preferred construction shows the use of rollers on the long and short arms of lever 42, it should be noted that fixed arcuate bearing surfaces or pivoted arcuate bearing surfaces may be employed thereon, if desired, for engagement with members 48 and 72, respectively. In such constructions, however, with fixed surfaces more friction results. The use of rollers works best and accordingly is desirable as the preferred construction. However, arcuate bearing surfaces will provide the constant lever arm ratio desired by applicant and in such an arrangement lines 102 and 104 would extend through the geometric centers of the arcuate bearing surfaces and the pivotal center of lever 42. Of course if the radius of such arcuate surface is made infinitely small, a knife edge contact surface will result such as indicated at 114 in Fig. 9. However, the lever arm distance provided will still be a constant and will provide the constant lever ratio condition desired.

In the drawings, the lever arm distances have been chosen so as to give a constant reduction of motion between a driving linear motion and a driven linear motion. It is obvious that the ratio of the lever arms can be so chosen as to give equal translations of motion, or even proportioned so as to give a constant increased linear motion between the driving and driven members.

I claim:

1. In a microscope of the character described, the combination of a first supporting member adapted to support optical elements of the microscope, a second supporting member for supporting said first member, guide means interconnecting said supporting members so as to allow rectilinear movement of said first member relative to said second member, and a fine adjustment mechanism for causing said rectilinear movement in a first direction, said adjustment mechanism comprising an abutment member carried by said first supporting member and arranged to move therewith, a substantially rectilinear abutment surface on said abutment member disposed perpendicularly to said first direction, operable driving means carried by said second supporting member and including a driving member and a control member, said driving member being arranged to move in a second predetermined direction at an angle to said first direction for producing a driving force, a substantially rectilinear surface on said driving member disposed perpendicularly to said second direction, said control member being connected to said driving member for moving said driving member relative to said second supporting member, a uniformly calibrated scale and an index mark adjacent thereto, said scale and index mark being carried in fixed relation to said control member and said second supporting member respectively so as to indicate amounts of relative movement therebetween, and a lever pivotally mounted upon means carried in fixed relation to said second supporting member and comprising a relatively short arm and a relatively long arm having arcuate bearing surfaces thereon operatively engaging said abutment surface and said rectilinear surface on said driving member, respectively, said lever and the abutment and driving members operatively associated therewith being so constructed and arranged that planes passing through and containing the pivotal axis of said lever and passing through the geometric centers of said arcuate bearing surfaces, respectively, will form for all operative positions of said lever an included angle which is substantially equal to the angle of deviation formed between said first direction and said second direction; whereby all equal increments of movement of said control member will produce corresponding increments of travel of said first supporting member and optical elements in said first direction which are equal and proportional to the ratio of said lever arms, thereby producing a constant lever arm ratio for said adjustment mechanism.

2. In a microscope of the character described, the combination of a first supporting member, a second supporting member, guide means interconnecting said supporting members for rectilinear movement, and an adjustment mechanism for changing the relative relation therebetween, said adjustment mechanism comprising an abutment carried by said first supporting member and arranged to move therewith in a first predetermined direction when an actuating force is applied thereto, an operable driving member carried by said second supporting member, a control member connected to said driving member for moving said driving member relative to said second supporting member, a uniformly calibrated scale and an index mark adjacent thereto, said scale and index mark being carried in fixed relation to said control member and said second supporting member respectively so as to indicate amounts of relative movement therebetween, said driving member being arranged to move in a second predetermined direction at an angle relative to said first predetermined direction for producing a driving force, and a movable lever member pivotally mounted upon means carried in fixed relation to said second supporting member, said movable lever member comprising a pair of arcuate bearing surfaces spaced at preselected distances from the pivotal axis of said movable lever member and operatively engaging respectively rectilinear surfaces on said abutment and said driving member, and which rectilinear surfaces are disposed substantially perpendicularly relative to said first and second predetermined directions, respectively, said movable lever member and the abutment and driving member operatively associated therewith being so constructed and arranged that planes containing the pivotal axis of said movable lever member and passing through the geometric centers of said arcuate bearing surfaces, respectively, form an included angle which is substantially equal to the angle of deviation formed between said predetermined directions of movement of said abutment and said driving member, whereby a substantially constant lever arm ratio is provided said adjustment mechanism so that for each successive predetermined increment of movement of said control member in a forward or reverse direction said abutment will be moved successive equal amounts in a corresponding direction.

3. In a microscope of the character described, the combination of a first supporting member, a second supporting member, guide means interconnecting said supporting members for rectilinear movement, and an adjustment mechanism for changing the relative relation between said members, said adjustment mechanism comprising an abutment carried by said first supporting member and arranged to move therewith in a first predetermined direction when a driving force is applied thereto, a driving member carried by said second supporting member and arranged to move in a second predetermined direction at an angle of predetermined deviation relative to said first direction for producing a driving force, a control member connected to said driving member for moving said driving member relative to said second supporting member, an index mark and a uniformly calibrated scale adjacent thereto, one of said scale and said index mark being carried in fixed relation to said control member and the other being carried in fixed relation to said second supporting member so as to indicate amounts of relative movement therebetween, and a pivotally mounted element carried by pivot means in fixed relation to said second supporting member and establishing a pivotal axis for said element, said element having a pair of curved bearing surfaces thereon operatively engaging respectively rectilinear surfaces on said abutment and said driving member, and which rectilinear surfaces are disposed in substantially perpendicular relation relative to said first and second predetermined directions, respectively, each curved bearing surface being so shaped that all operative portions thereof are substantially equidistantly arranged relative to an adjacent predetermined geometric center, said centers being disposed at preselected distances, respectively, from said axis and establishing a predetermined lever ratio, and being so spaced from each other that a first plane containing said axis and one of said geometric centers and a second plane containing said axis and the other of said geometric centers will have an included angle which is substantially equal to said angle of deviation, whereby for all operative positions of said adjustment mechanism successive equal increments of movement of said control member, as indicated by the calibrations and said index, will effect increments of rectilinear travel of said first supporting member which are equal to one another and which are directly proportional to said lever ratio.

ALBIN A. GRADISAR.

References Cited in the file of this patent

UNITED STATES PATENTS

| Number | Name | Date |
|---|---|---|
| 1,933,386 | Ott | Oct. 31, 1933 |